(12) United States Patent
Horita

(10) Patent No.: US 11,657,491 B2
(45) Date of Patent: May 23, 2023

(54) LEARNING DATA COLLECTION APPARATUS, LEARNING DATA COLLECTION METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 17/203,198

(22) Filed: Mar. 16, 2021

(65) Prior Publication Data

US 2021/0209422 A1 Jul. 8, 2021

Related U.S. Application Data

(63) Continuation of application No. PCT/JP2019/036369, filed on Sep. 17, 2019.

(30) Foreign Application Priority Data

Sep. 20, 2018 (JP) .............................. JP2018-176316

(51) Int. Cl.
*G06K 9/00* (2022.01)
*G06T 7/00* (2017.01)
(Continued)

(52) U.S. Cl.
CPC ........ *G06T 7/0004* (2013.01); *G06F 18/2178* (2023.01); *G06T 7/0002* (2013.01);
(Continued)

(58) Field of Classification Search
CPC ................. G06T 7/0004; G06T 7/0002; G06T 2207/30168; G06V 10/25; G06V 10/7747;
(Continued)

(56) References Cited

U.S. PATENT DOCUMENTS

2018/0144214 A1 5/2018 Hsieh et al.
2018/0232601 A1 8/2018 Feng et al.
(Continued)

FOREIGN PATENT DOCUMENTS

JP 2011-059810 A 3/2011
JP 2017-224184 A 12/2017

OTHER PUBLICATIONS

Kwak, Jueun, Taehyung Lee, and Chang Ouk Kim. "An incremental clustering-based fault detection algorithm for class-imbalanced process data." IEEE Transactions on Semiconductor Manufacturing 28.3 (2015): 318-328. (Year: 2015).*

(Continued)

*Primary Examiner* — Jonathan S Lee
(74) *Attorney, Agent, or Firm* — Studebaker & Brackett PC

(57) ABSTRACT

Provided are a learning data collection apparatus, a learning data collection method, and a program for collecting learning data to be used for efficient retraining. A learning data collection apparatus (10) includes an inspection image acquisition unit (11) that acquires an inspection image, a region detection result acquisition unit (damage detection result acquisition unit (13)) that acquires a region detection result the region detection result indicating a region detected by a region detector that is trained, a correction history acquisition unit (15) that acquires a correction history of the region detection result, a calculation unit (17) that calculates correction quantification information obtained by quantifying the correction history, a database that stores the inspection image, the region detection result, and the correction history in association with each other, an image extraction condition setting unit (19) that sets a threshold value of the correction quantification information as an extraction condition, the extraction condition being a condition for extracting the inspection image to be used for retraining from the (Continued)

database, and a first learning data extraction unit (21) that extracts, as learning data for retraining the region detector, the inspection image satisfying the extraction condition and the region detection result and the correction history that are associated with the inspection image.

12 Claims, 15 Drawing Sheets

(51) Int. Cl.
| | |
|---|---|
| *G06F 18/21* | (2023.01) |
| *G06V 10/25* | (2022.01) |
| *G06V 10/771* | (2022.01) |
| *G06V 10/774* | (2022.01) |
| *G06V 10/778* | (2022.01) |
| *G06V 10/50* | (2022.01) |
| *G06V 10/44* | (2022.01) |
| *G06V 10/46* | (2022.01) |

(52) U.S. Cl.
CPC .............. *G06V 10/25* (2022.01); *G06V 10/44* (2022.01); *G06V 10/50* (2022.01); *G06V 10/771* (2022.01); *G06V 10/7747* (2022.01); *G06V 10/7784* (2022.01); *G06T 2207/30168* (2013.01); *G06V 10/467* (2022.01)

(58) Field of Classification Search
CPC ...... G06V 10/771; G06V 10/50; G06V 10/44; G06V 10/7784; G06V 10/467; G06F 18/2178
USPC .......................................................... 382/159
See application file for complete search history.

(56) References Cited

U.S. PATENT DOCUMENTS

| | | | |
|---|---|---|---|
| 2019/0251471 A1 | 8/2019 | Morita et al. | |
| 2020/0175352 A1* | 6/2020 | Cha | .......................... G06N 3/04 |

OTHER PUBLICATIONS

Chien, Chen-Fu, Chia-Yu Hsu, and Pei-Nong Chen. "Semiconductor fault detection and classification for yield enhancement and manufacturing intelligence." Flexible Services and Manufacturing Journal 25 (2013): 367-388. (Year: 2013).*
Tobin, Kenneth W., et al. "Using historical wafermap data for automated yield analysis." Journal of Vacuum Science & Technology A: Vacuum, Surfaces, and Films 17.4 (1999): 1369-1376. (Year: 1999).*
International Search Report issued in PCT/JP2019/036369; dated Dec. 3, 2019.
International Preliminary Report on Patentability and Written Opinion issued in PCT/JP2019/036369; dated Mar. 23, 2021.
Sekimoto, Y., "About the efforts to make road repairment work efficient by utilizing artificial intelligence", Cities and governance, Sep. 15, 2017, vol. 28, pp. 71-81, (Tokyo: Japan Municipal Research Center) [retrieved on Nov. 19, 2019].
Fujitsus Family Neurosim/L V3 User's manual (Layered Neural Network Simulator), J1S1-3030-01, (First Edition), FUJITSU, Jan. 1995, p. 15.
Laroze Mathieu et al.; "Active Learning to Assist Annotation of Aerial Images in Environmental Surveys"; 2018 International Conference on Content-Based Multimedia Indexing (CBMI); Sep. 4, 2018; pp. 1-6; XP033432846; IEEE.
Yao Angela et al.; "Interactive Object Detection"; 2012 IEEE Conference on Computer Vision and Pattern Recognition (CVPR); Jun. 16, 2012; pp. 3242-3249; XP032232459; IEEE.
Papadopoulos Dim P. et al.; "We don't need no bounding-boxes: Training object class detectors using only human verification"; 2016 IEEE Conference on Computer Vision and Pattern Recognition (CVPR); Jun. 27, 2016; pp. 854-863; XP033021216; IEEE.
The extended European search report issued by the European Patent Office dated Oct. 21, 2021, which corresponds to European Patent Application No. 19862283.9-1207 and is related to U.S. Appl. No. 17/203,198.

* cited by examiner

FIG. 11

| INSPECTION IMAGE | MAXIMUM CRACK WIDTH (mm) | MINIMUM CRACK SPACING (m) | DAMAGE OTHER THAN CRACKS | MEMBER | DISTANCE FROM THE SEA (km) | TRAFFIC FLOW (VEHICLE/DAY) | AGE |
|---|---|---|---|---|---|---|---|
| aaa.jpg | 0.05 | 3 | NO DAMAGE | DECK | 1 | 1000 | 5 |
| bbb.jpg | 0.1 | 2.5 | NO DAMAGE | DECK | 10 | 100 | 14 |
| ccc.jpg | 0.15 | 1.5 | NO DAMAGE | PIER | 10 | 100 | 14 |
| ddd.jpg | 0.25 | 0.5 | WATER LEAKAGE | DECK | 2 | 250 | 20 |
| eee.jpg | 0.5 | 0.1 | FREE LIME PEELING | DECK | 3 | 1500 | 47 |
| fff.jpg | 0.3 | 0.3 | WATER LEAKAGE FREE LIME | DECK | 0.1 | 500 | 25 |
| ⋯⋯ | ⋯⋯ | ⋯⋯ | ⋯⋯ | ⋯⋯ | ⋯⋯ | ⋯⋯ | ⋯⋯ |

LEARNING DATA COLLECTION APPARATUS, LEARNING DATA COLLECTION METHOD, AND PROGRAM

CROSS-REFERENCE TO RELATED APPLICATIONS

The present application is a Continuation of PCT International Application No. PCT/JP2019/036369 filed on Sep. 17, 2019 claiming priority under 35 U.S.C § 119(a) to Japanese Patent Application No. 2018-176316 filed on Sep. 20, 2018. Each of the above applications is hereby expressly incorporated by reference, in its entirety, into the present application.

BACKGROUND OF THE INVENTION

1. Field of the Invention

The present invention relates to a learning data collection apparatus, a learning data collection method, and a program, and more specifically to a learning data collection apparatus, a learning data collection method, and a program for extracting learning data for retraining a region detector.

2. Description of the Related Art

In recent years, an object to be inspected have been inspected using a captured image of the object. The inspection of the object is performed by detecting and identifying a predetermined region from the captured image of the object. For example, for damage inspection of a structure, a captured image of the structure, such as a bridge, a road, or a building, which is an object to be inspected, is acquired. The captured image is subjected to image processing to detect and identify damage to the structure from the captured image.

One known method for detecting a region from a captured image subjected to image processing is a method for detecting the region by using a region detector (for example, a damage detector) trained by machine learning. It is also known that a region detector trained by machine learning is retrained (or additionally trained) to provide improved accuracy of region detection. However, it takes much time to cause a region detector to learn all of a large number of images accumulated in a database or the like as learning data. Additionally, it is difficult to expect a high learning effect without learning data suitable as learning data. That is, it is difficult to cause a region detector to perform efficient learning merely by random selection of learning data.

Accordingly, a method for extracting learning data for machine learning to provide efficient learning has been proposed.

For example, JP2017-224184A describes a technique for reliably and quickly improving the accuracy of identifying images. Specifically, a technique is described in which an image that is not used for previous machine learning and that has a low similarity to images used for previous machine learning is used for machine learning.

SUMMARY OF THE INVENTION

When a region of an object is detected using a region detector trained by machine learning, an inspection image for which a user is not satisfied with a region detection result obtained by the region detector is used for retraining the region detector to provide efficient machine learning.

The user may make a minor correction to the region detection result. Such minor corrections require time for learning.

For efficient retraining, it is desirable to extract an inspection image that is not satisfactory to the user and to exclude region detection results subjected to minor correction from the target of retraining.

The present invention has been made in view of such circumstances, and an object thereof is to provide a learning data collection apparatus, a learning data collection method, and a program for collecting learning data to be used for efficient retraining.

To achieve the object described above, a learning data collection apparatus according to an aspect of the present invention includes an inspection image acquisition unit that acquires an inspection image, the inspection image being a captured image of an object to be inspected, a region detection result acquisition unit that acquires a region detection result on the basis of the inspection image, the region detection result indicating a region detected by a region detector that is trained, a correction history acquisition unit that acquires a correction history of the region detection result, a calculation unit that calculates correction quantification information obtained by quantifying the correction history, a database that stores the inspection image, the region detection result, and the correction history in association with each other, an image extraction condition setting unit that sets a threshold value of the correction quantification information as an extraction condition, the extraction condition being a condition for extracting the inspection image to be used for retraining from the database, and a first learning data extraction unit that extracts, as learning data for retraining the region detector, the inspection image satisfying the extraction condition and the region detection result and the correction history that are associated with the inspection image from the database.

According to this aspect, correction quantification information obtained by quantifying a correction history is calculated, and an inspection image having certain correction quantification information is extracted as learning data. This makes it possible to collect, as learning data, an inspection image for which a user makes a correction to a region detection result and the correction is not minor, and using the collected learning data makes it possible to efficiently retrain the region detector.

Preferably, the learning data collection apparatus further includes an actual size information acquisition unit that acquires actual size information of the inspection image, and the calculation unit calculates the correction quantification information converted into an actual size in accordance with the actual size information.

Preferably, the image extraction condition setting unit accepts image information of the object, and the first learning data extraction unit extracts the inspection image from the database on the basis of the image information and the threshold value of the correction quantification information.

Preferably, the image information of the object is information including at least one of size information of the region, position information of the region, direction information of the region, type information of the region, or meta information of the inspection image.

Preferably, the learning data collection apparatus further includes an image quality determination unit that determines image quality of the inspection image, the image extraction condition setting unit accepts information related to the image quality of the inspection image, and the first learning data extraction unit extracts the inspection image from the database on the basis of the information related to the image quality and the threshold value of the correction quantification information.

Preferably, the learning data collection apparatus further includes an accessory information acquisition unit that acquires accessory information including at least one of identification information, member information, location information, environment information, material information, inspection information, or management information of the inspection image, the image extraction condition setting unit accepts the accessory information, and the first learning data extraction unit extracts the inspection image on the basis of accessory information of the inspection image and the accessory information accepted by the image extraction condition setting unit.

Preferably, the learning data collection apparatus further includes a learning history acquisition unit that acquires history information related to a history of one or more uses of the inspection image for learning, and a statistical information generation unit that generates statistical information of an image used for learning on the basis of the acquired history information, and the first learning data extraction unit extracts the inspection image from the database on the basis of the generated statistical information.

Preferably, the inspection image acquisition unit includes segment images obtained by dividing the captured image of the object, and a panoramic composite image obtained by combining the segment images, the correction history acquisition unit acquires the correction history for the panoramic composite image, and the first learning data extraction unit extracts a region in the panoramic composite image on the basis of the correction history for the panoramic composite image, and extracts at least one of segment images forming the region among the segment images.

Preferably, the learning data collection apparatus further includes a second learning data extraction unit that extracts, as learning data for retraining the region detector, an inspection image from among inspection images that are not extracted by the first learning data extraction unit.

Preferably, the learning data collection apparatus further includes an image confirmation display unit that displays the extracted inspection image and information related to the inspection image.

A learning data collection method according to another aspect of the present invention includes the steps of acquiring an inspection image, the inspection image being a captured image of an object to be inspected; acquiring a region detection result on the basis of the inspection image, the region detection result indicating a region detected by a region detector that is trained; acquiring a correction history of the region detection result; calculating correction quantification information obtained by quantifying the correction history; setting a threshold value of the correction quantification information as an extraction condition, the extraction condition being a condition for extracting the inspection image to be used for retraining from a database that stores the inspection image, the region detection result, and the correction history in association with each other; and extracting, as learning data for retraining the region detector, the inspection image satisfying the extraction condition and the region detection result and the correction history that are associated with the inspection image from the database.

A program according to another aspect of the present invention causes a computer to execute a learning data collection process including the steps of acquiring an inspection image, the inspection image being a captured image of an object to be inspected; acquiring a region detection result on the basis of the inspection image, the region detection result indicating a region detected by a region detector that is trained; acquiring a correction history of the region detection result; calculating correction quantification information obtained by quantifying the correction history; setting a threshold value of the correction quantification information as an extraction condition, the extraction condition being a condition for extracting the inspection image to be used for retraining from a database that stores the inspection image, the region detection result, and the correction history in association with each other; and extracting, as learning data for retraining the region detector, the inspection image satisfying the extraction condition and the region detection result and the correction history that are associated with the inspection image from the database.

According to the present invention, correction quantification information obtained by quantifying a correction history is calculated, and an inspection image having certain correction quantification information is extracted as learning data. This makes it possible to collect, as learning data, an inspection image for which a user makes a correction to a region detection result and the correction is not minor, and using the collected learning data makes it possible to efficiently retrain a region detector.

BRIEF DESCRIPTION OF THE DRAWINGS

FIG. 11 is a diagram illustrating an example configuration of stored information obtained from an inspection image and stored in a database in association with the inspection image;

DESCRIPTION OF THE PREFERRED EMBODIMENTS

In the following, a learning data collection apparatus, a learning data collection method, and a program according to preferred embodiments of the present invention will be described with reference to the accompanying drawings. The following describes an example of damage inspection of a structure. Specifically, in the following description, an object to be inspected is a structure and is inspected to detect damage to a region (damaged region) from an inspection image of the structure.

Figure 1:
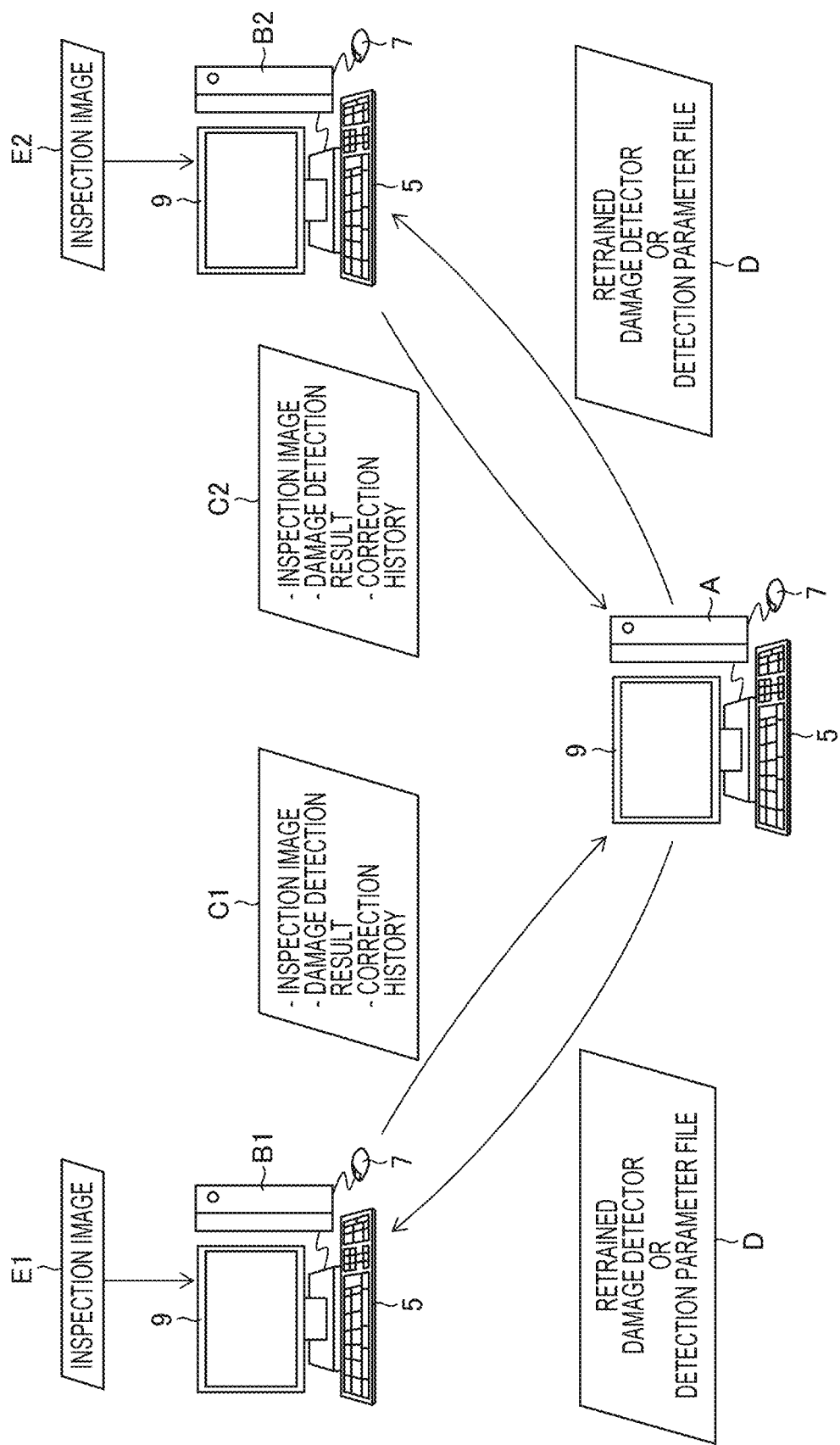
FIG. 1 is a conceptual diagram illustrating a learning data collection apparatus and damage detectors connected thereto.

FIG. 1 is a conceptual diagram illustrating a learning data collection apparatus according to the present invention and damage detectors, which are an example of region detectors connected to the learning data collection apparatus. FIG. 1 illustrates a computer A having mounted therein a learning data collection apparatus according to the present invention, and computers B1 and B2 each having mounted therein a trained damage detector. The computer A, the computer B1, and the computer B2 are connected to a network and are capable of communicating information to each other.

The computer A functions as a server that receives upload data C1 and upload data C2, each including an inspection image, a damage detection result (region detection result), and a correction history, which are respectively uploaded from the computers B1 and B2, via a network. The computer A also functions as a learning computer capable of retraining the damage detectors mounted in the computers B1 and B2. The computer A delivers, to the computers B1 and B2, retrained damage detectors or detection parameter files obtained by retraining the damage detectors (indicated by reference symbol D in FIG. 1).

The computers B1 and B2 upload damage detection results, which are output from the mounted damage detectors in response to input inspection images E1 and E2, and histories of corrections made by the respective users to the damage detection results to the computer A as the upload data C1 and the upload data C2. The computers B1 and B2 upload the upload data C1 and the upload data C2 for all or some of the inspection images processed by the respective damage detectors. The damage detectors mounted in the computers B1 and B2 are damage detectors that have already been trained by machine learning, and are damage detectors trained by using known technology.

The computer A saves the received upload data C1 and upload data C2 in a database 23 (FIG. 2) mounted therein. Further, the computer A extracts learning data by using a learning data collection apparatus 10 (FIG. 2) mounted therein and uses the extracted learning data for retraining the damage detectors, making it possible to efficiently improve the detection performance of the damage detectors. Retraining is a concept including a case where learning data is added to learn again all the pieces of learning data that have already been learned, and a case where only learning data is additionally learned. The number of computers having mounted therein damage detectors to be connected to the computer A (in FIG. 1, the computers B1 and B2) is not limited and may be one or more.

Each of the computer A, the computer B1, and the computer B2 is connected to a monitor 9, and the user inputs a command via a keyboard 5 and a mouse 7. The type of the illustrated computers is an example. For example, tablet terminals may be used instead of the illustrated computers.

First Embodiment

Next, a first embodiment of the present invention will be described.

Figure 2:
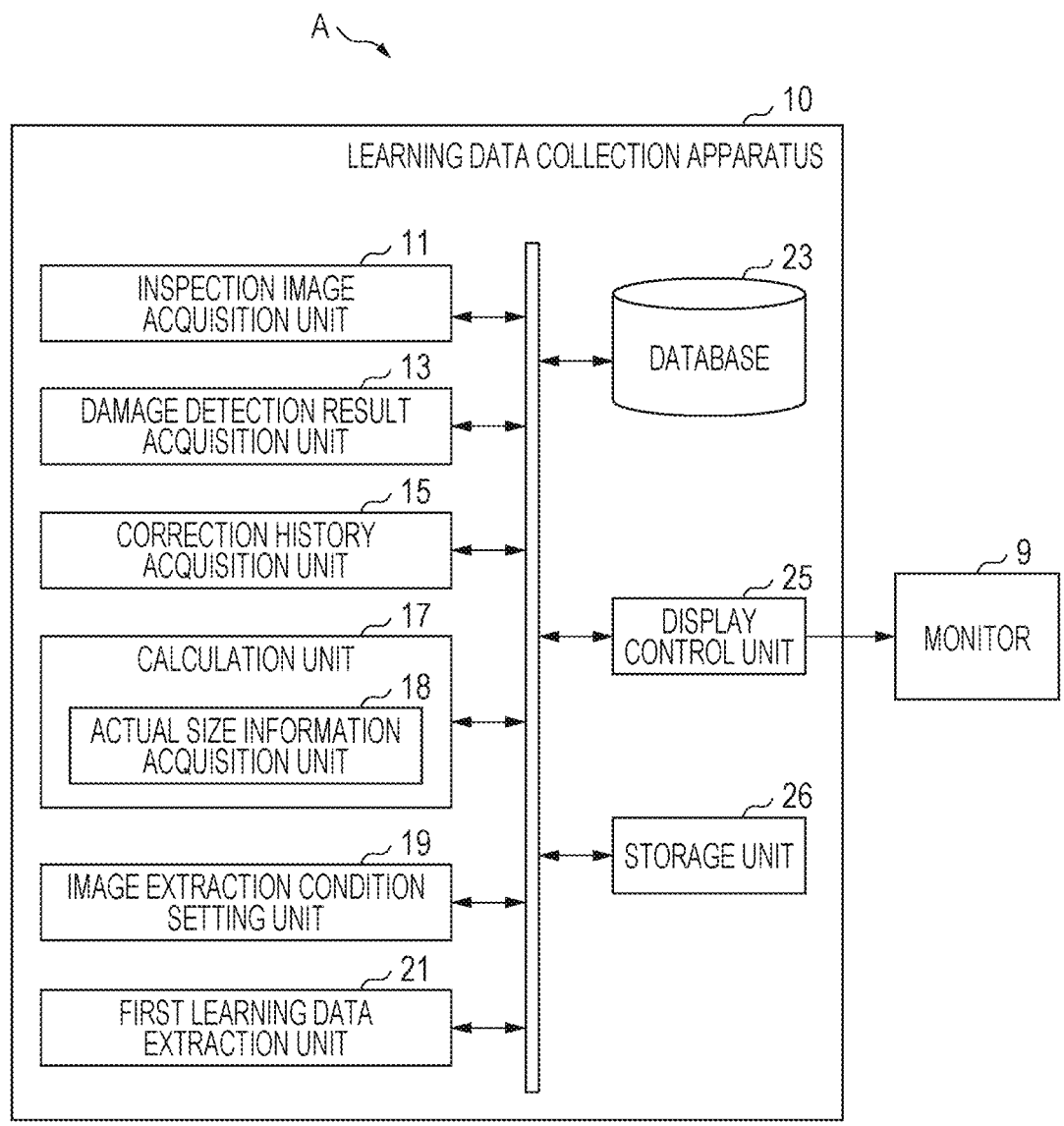
FIG. 2 is a block diagram illustrating an example configuration of main functions of the learning data collection apparatus.

FIG. 2 is a block diagram illustrating an example configuration of main functions of the learning data collection apparatus 10 mounted in the computer A according to this embodiment. The hardware structure for performing various kinds of control of the learning data collection apparatus 10 illustrated in FIG. 2 is implemented as various processors as described below. The various processors include a CPU (Central Processing Unit), which is a general-purpose processor executing software (program) to function as various control units, a programmable logic device (PLD) such as an FPGA (Field Programmable Gate Array), which is a processor whose circuit configuration is changeable after manufacture, a dedicated electric circuit, which is a processor having a circuit configuration specifically designed to execute specific processing, such as an ASIC (Application Specific Integrated Circuit), and so on.

A single processing unit may be configured by one of the various processors or by a combination of two or more processors of the same type or different types (for example, a plurality of FPGAs or a combination of a CPU and an FPGA). Alternatively, a plurality of control units may be configured by a single processor. Examples of configuring a plurality of control units by a single processor include, first, a form in which, as typified by a computer such as a client or server computer, the single processor is configured by a combination of one or more CPUs and software and the processor functions as the plurality of control units. The examples include, second, a form in which, as typified by a system on chip (SoC) or the like, a processor is used in which the functions of the entire system including the plurality of control units are implemented by a single IC (Integrated Circuit) chip. As described above, the various control units are configured using one or more of the various processors described above as a hardware structure.

The learning data collection apparatus 10 includes an inspection image acquisition unit 11, a damage detection result acquisition unit (region detection result acquisition unit) 13, a correction history acquisition unit 15, a calculation unit 17, an actual size information acquisition unit 18, an image extraction condition setting unit 19, a first learning data extraction unit 21, the database 23, a display control unit 25, and a storage unit 26. The storage unit 26 stores programs, information related to various kinds of control of the learning data collection apparatus 10, and so on. The display control unit 25 controls display of the monitor 9.

The inspection image acquisition unit 11 acquires an inspection image obtained by capturing an image of a structure that is an inspection target. The inspection image acquired by the inspection image acquisition unit 11 is an image input to the damage detector (region detector) mounted in the computer B1 or B2, and damage (region) in the inspection image is detected by the damage detector.

The damage detection result acquisition unit 13 acquires a damage detection result of the inspection image acquired by the inspection image acquisition unit 11. The damage detection result is output from the damage detector mounted in the computer B1 or B2 and is uploaded to the computer A.

The correction history acquisition unit 15 acquires a correction history for the damage detection result. The correction history acquired by the correction history acquisition unit 15 is a history of corrections made to the damage detection result acquired by the damage detection result acquisition unit 13. When no correction is made, the correction history acquisition unit 15 acquires, as a correction history, information indicating that no correction is made.

The calculation unit 17 calculates correction quantification information obtained by quantifying the correction history. The calculation unit 17 may include the actual size information acquisition unit 18, and the actual size information acquisition unit 18 acquires actual size information of the inspection image. In this case, the calculation unit 17 calculates correction quantification information converted into the actual size in accordance with the actual size information. The calculation of the correction quantification information, which is performed by the calculation unit 17, will be described.

The database 23 stores an inspection image, a damage detection result, and a correction history in association with each other. The database 23 stores the inspection image acquired by the inspection image acquisition unit 11, the damage detection result acquired by the damage detection result acquisition unit 13, and the correction history acquired by the correction history acquisition unit 15 in association with each other.

The image extraction condition setting unit 19 sets a threshold value of the correction quantification information as an extraction condition, the extraction condition being a condition for extracting an inspection image to be used for retraining from the database 23. The threshold value of the correction quantification information is determined in accordance with the correction quantification information saved in the database 23. The user changes the threshold value to extract, as learning data, an inspection image for which the damage detection result has been corrected and for which the correction is not minor. For example, the user can set a predetermined threshold value and collect inspection images having correction quantification information equal to or larger than the threshold value.

The first learning data extraction unit 21 extracts an inspection image satisfying the extraction condition and a damage detection result and a correction history associated with the inspection image from the database 23 as learning data for retraining the damage detector.

Data Stored in Database

Next, a specific example of the data stored in the database 23 will be described. The database 23 stores at least inspection images, damage detection results, and correction histories uploaded from the computers B1 and B2.

Figure 3:
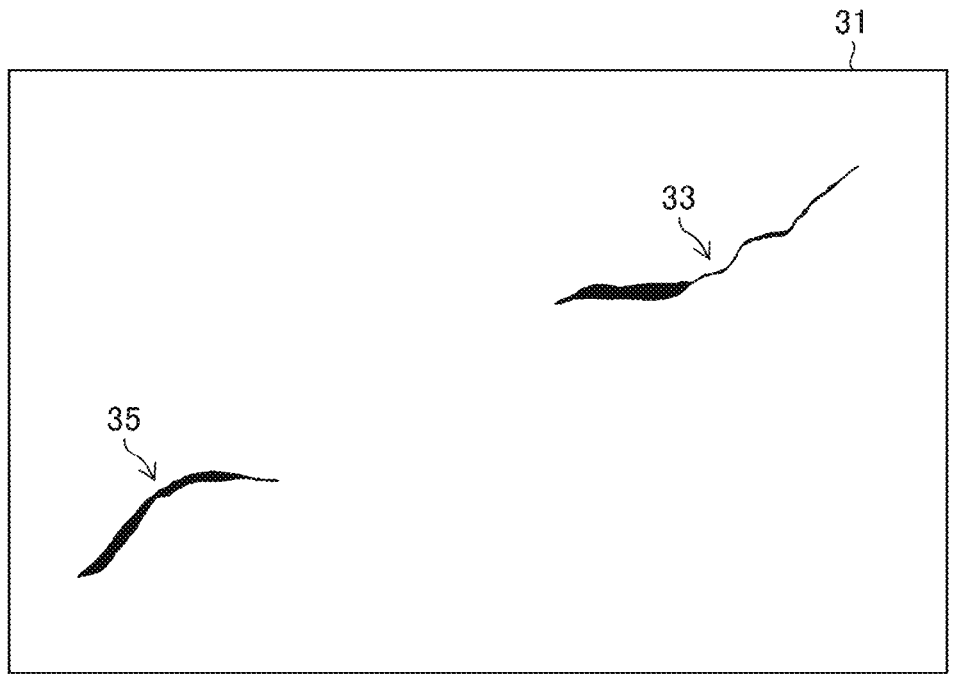
FIG. 3 is a diagram illustrating an example of an inspection image acquired by an inspection image acquisition unit.

FIG. 3 is a diagram illustrating an example of an inspection image acquired by the inspection image acquisition unit 11. An inspection image 31 is a captured image of a portion of the deck of a bridge, which is an example of a structure as an inspection target. The inspection image 31 has a crack 33 and a crack 35. The inspection image 31 is input to the computer B1 or B2, and a damage detection result is output from the damage detector mounted in the computer B1. The structure is not limited to a bridge and may be any other structure such as a tunnel, a box culvert, a dam, a breakwater, or an architectural element (such as a wall surface or a floor).

Figure 4:
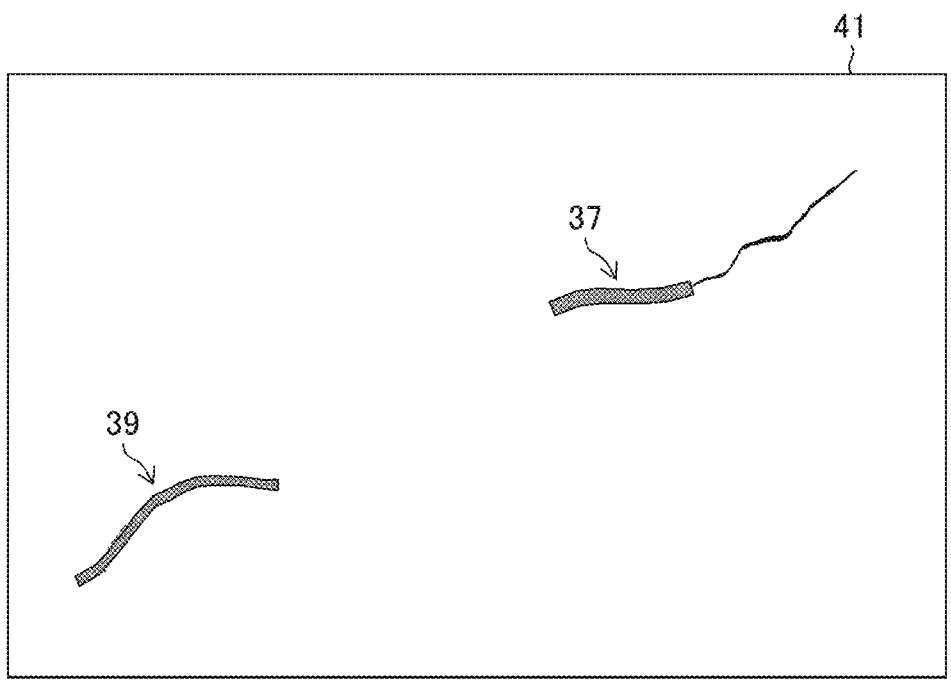
FIG. 4 is a diagram illustrating damage detection results.

FIG. 4 is a diagram illustrating a damage detection result obtained in response to the input of the inspection image illustrated in FIG. 3 to the damage detector. A damage detection result 41 has a damage detection result 37 for the crack 33, and a damage detection result 39 for the crack 35. The damage detection result 39 is satisfactory, and the crack 35 is fully detected. In contrast, the damage detection result 37 is a defective damage detection result since the crack 33 is not fully detected. Accordingly, the user corrects the damage detection result 37.

Figure 5:
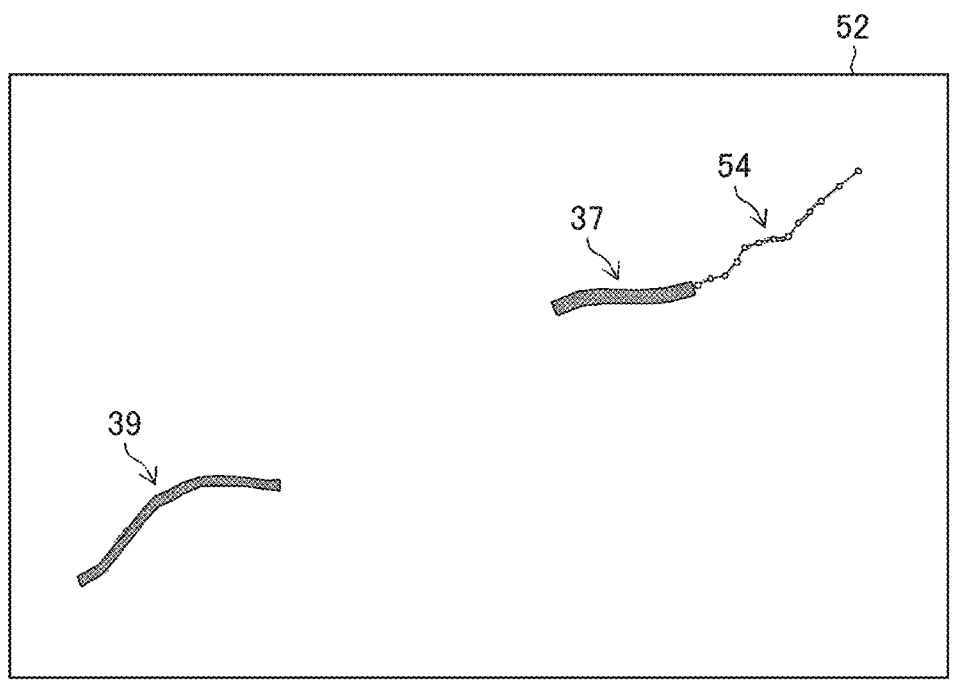
FIG. 5 is a conceptual diagram illustrating a correction history.

FIG. 5 is a conceptual diagram illustrating a history of corrections made by the user to the damage detection result 41 illustrated in FIG. 4. In a correction history 52, an additional vector 54 is added to the damage detection result 37 for the crack 33. That is, since the crack 33 is not fully detected, the user manually adds the additional vector 54 to the damage detection result 37.

The inspection image 31, the damage detection result 41, and the correction history 52 described in the foregoing specific example are uploaded from the computer B1 or B2 to the computer A.

Correction Quantification Information

Next, the correction quantification information will be described. Correction quantification information is calculated by the calculation unit 17 quantifying a correction history. The quantification (amount of correction) of the correction history is, for example, in the case of a crack or the like, information indicating the length of a vector added or deleted through correction, or the amount of change in coordinates of a vector moved through correction. In the case of, for example, water leakage, free lime, peeling, exposure of reinforcing bars, or the like, the quantification (amount of correction) of the correction history is the area of a region added or deleted through correction or the amount of change in the area of the region. The image extraction condition setting unit 19 sets a threshold value corresponding to the correction quantification information saved in the database 23, and the first learning data extraction unit 21 extracts, for example, an inspection image having correction quantification information equal to or larger than the threshold value.

The calculation unit 17 may or may not include the actual size information acquisition unit 18. When the calculation unit 17 does not include the actual size information acquisition unit 18, the amount of correction for the pixel size is set as the correction quantification information. When the calculation unit 17 includes the actual size information acquisition unit 18, the calculation unit 17 calculates an amount of correction converted into the actual size using the actual size information (the photographic-subject resolution (mm/pixel) or the size of a member or the like in the image). The calculation unit 17 including the actual size information acquisition unit 18 can more accurately calculate the amount of correction.

Figure 6:
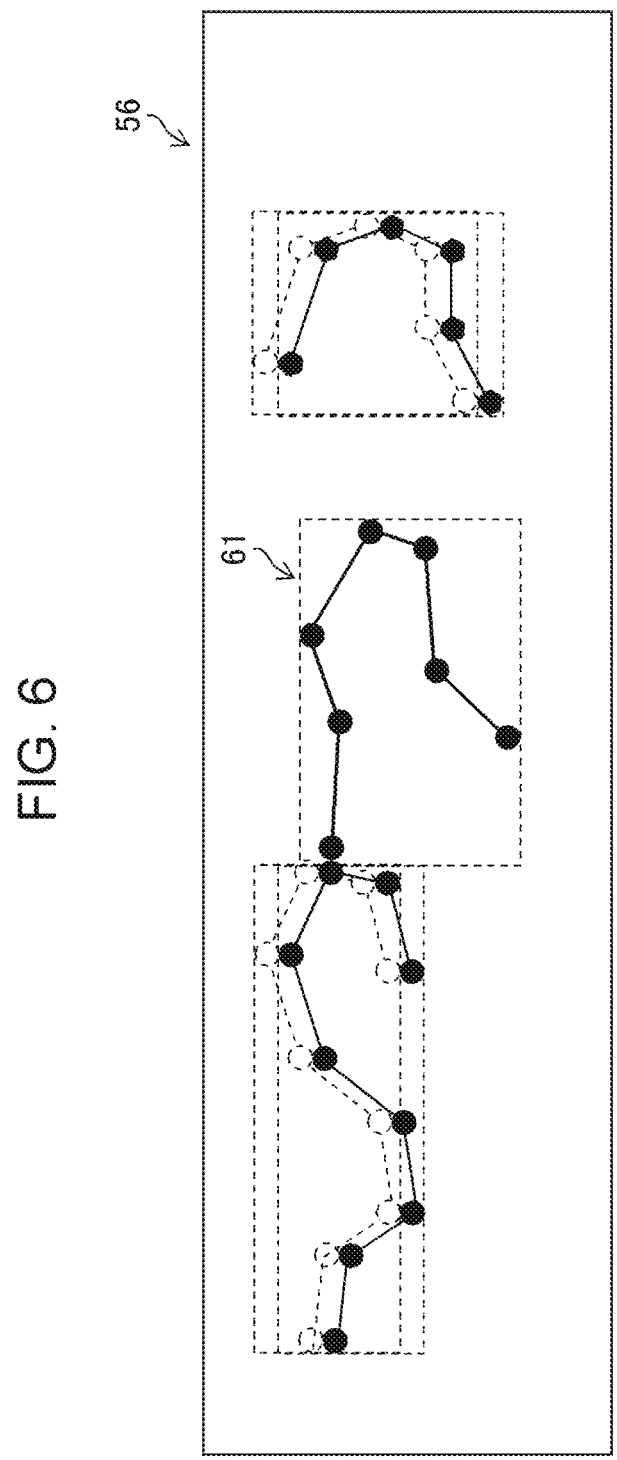
FIG. 6 is a diagram illustrating a specific example of the correction history.
Figure 7:
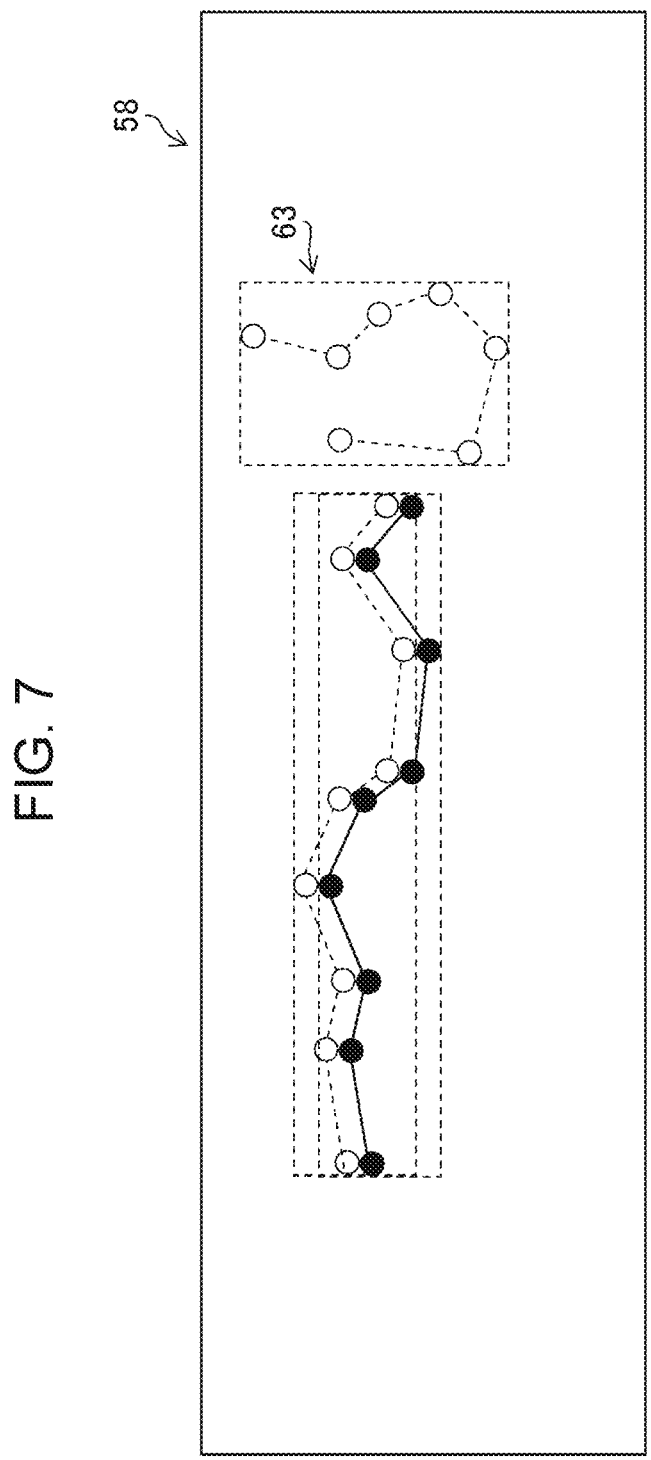
FIG. 7 is a diagram illustrating a specific example of the correction history.
Figure 8:
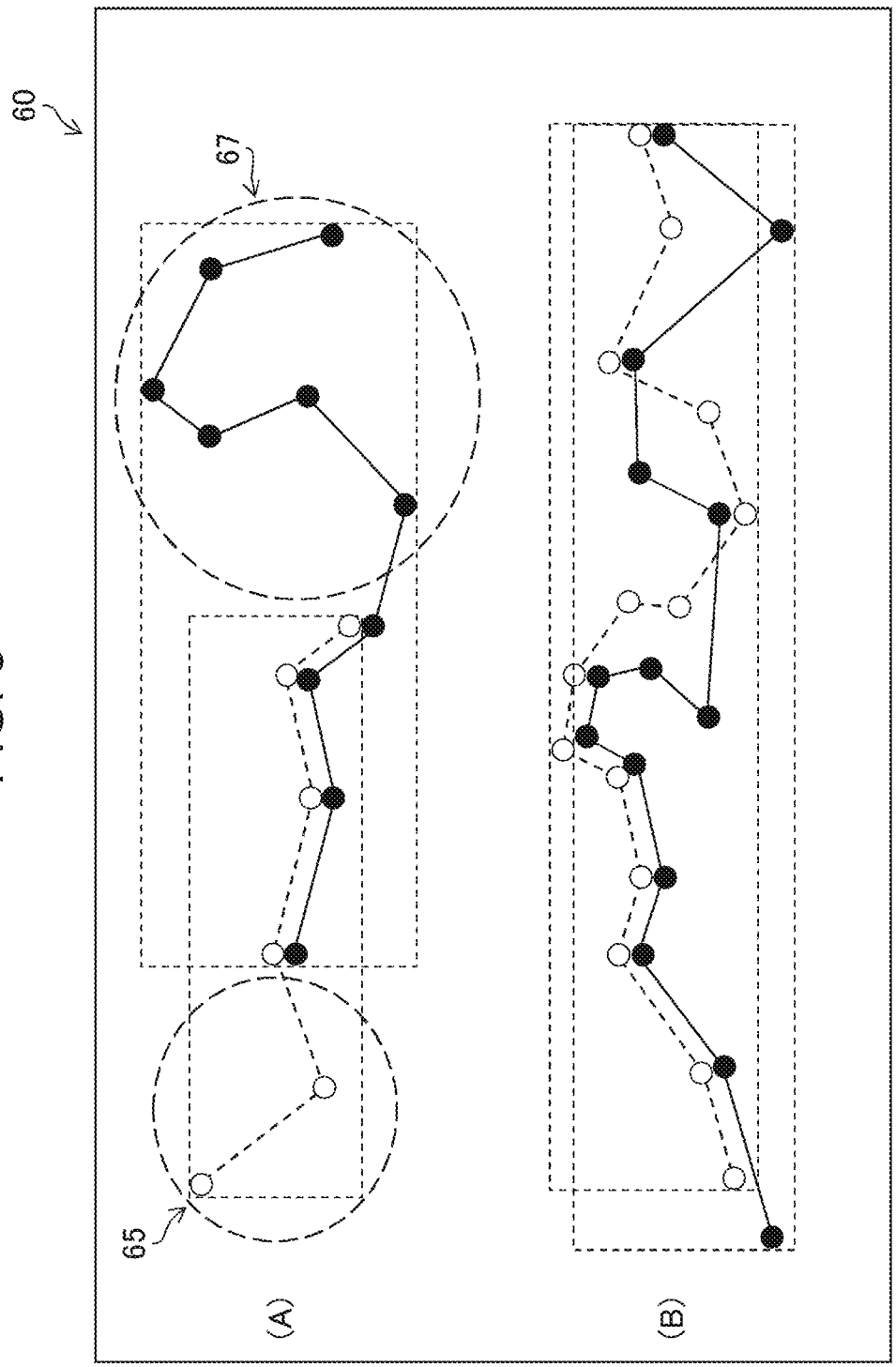
FIG. 8 is a diagram illustrating a specific example of the correction history.

FIG. 6, FIG. 7, and FIG. 8 are diagrams illustrating specific examples of the correction history acquired by the correction history acquisition unit 15. In FIG. 6, FIG. 7, and FIG. 8, a vector (detection vector) output from the damage detector in response to detection of damage (a crack) is indicated by a dotted line, and a vector obtained after a correction is made by the user (corrected vector) is indicated by a solid line. A portion where the dotted line and the solid line are drawn substantially in parallel is a portion where the detection vector and the corrected vector actually overlap each other, and indicates that the detection performed by the damage detector is satisfactory.

A correction history 56 illustrated in FIG. 6 indicates a case where an additional correction is made by the user. Specifically, in the correction history 56, a corrected vector that is not output from the damage detector is added to a region 61 by the user, and undetected damage is added in response to the correction made by the user.

A correction history 58 illustrated in FIG. 7 indicates a case where erroneous detections corrected by the user. Specifically, in the correction history 58, damage is detected in a region 63. However, only a detection vector is drawn in the region 63, and no corrected vector is drawn in the region 63. Accordingly, the detection vector in the region 63 is caused by erroneous detection and is thus deleted through correction.

In a correction history 60 illustrated in FIG. 8, in part (A) of FIG. 8, the detection vector and the corrected vector partially overlap each other in a region. In another region, a vector is deleted, and a vector is added in still another region. Specifically, since only the detection vector is present in a region 65, the erroneous detection is deleted through correction in the region 65. Since only the corrected vector is present in the region 67, undetected damage is added to the region 67. In part (B) of FIG. 8, a correction history is illustrated in which the coordinate values of a portion of the vector are changed through correction. Specifically, four coordinate values indicated by an arrow in part (B) of FIG. 8 are different between the detection vector and the corrected vector, and a portion of the detected damage is changed.

While specific examples of the correction history have been described, the correction history is not limited to the described ones, and various kinds of correction histories may be employed.

Learning Data Collection Process

Figure 9:
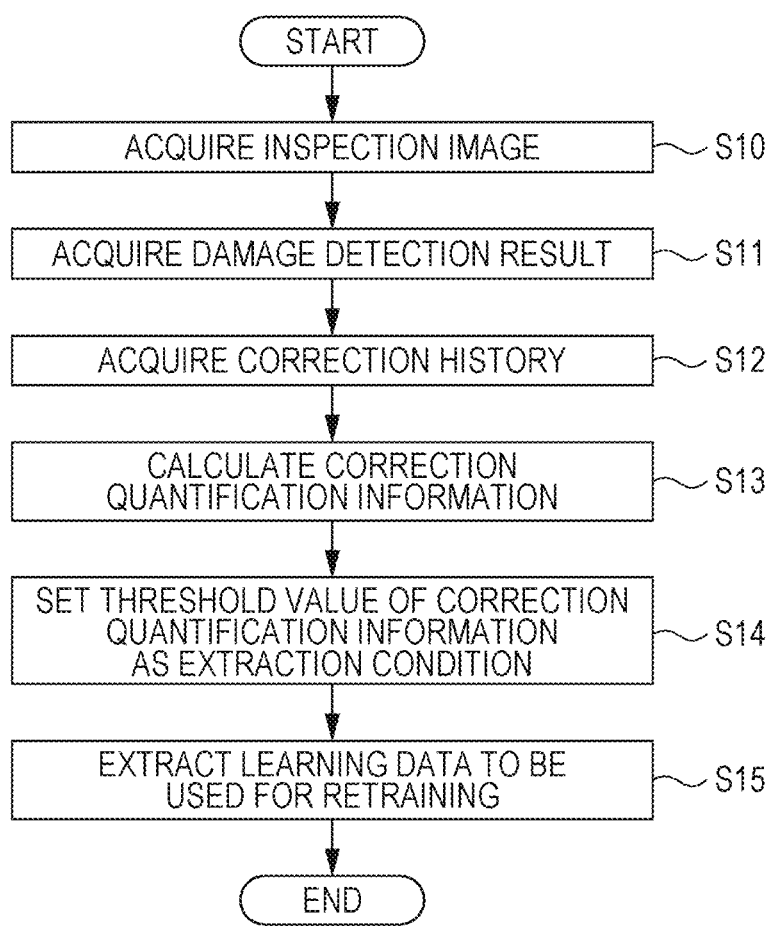
FIG. 9 is a flowchart illustrating a learning data collection process.

Next, a learning data collection process (learning data collection method) using the learning data collection apparatus 10 will be described. FIG. 9 is a flowchart illustrating a learning data collection process (learning data collection method) using the learning data collection apparatus 10.

First, the inspection image acquisition unit 11 acquires inspection images uploaded from the computers B1 and B2 (step S10). Then, the damage detection result acquisition unit 13 acquires damage detection results uploaded from the computers B1 and B2 (step S11). Then, the correction history acquisition unit 15 acquires correction histories uploaded from the computers B1 and B2 (step S12). Thereafter, the calculation unit 17 calculates correction quantification information based on the acquired correction histories (step S13). Thereafter, the image extraction condition setting unit 19 sets a threshold value of the correction quantification information as an extraction condition (step S14). Thereafter, the first learning data extraction unit 21 extracts learning data for retraining (step S15).

The configurations and functions described above can be each implemented by any hardware, software, or a combination of both, as appropriate. For example, the present invention is also applicable to a program that causes a computer to execute the processing steps (processing procedure) described above, a computer-readable recording medium (non-transitory recording medium) storing the program, or a computer into which the program is installable.

As described above, in this embodiment, a correction history is quantified, and learning data is extracted according to the quantified extraction condition. Accordingly, an inspection image to which a correction is made and for which the correction is not minor is extracted as learning data. This enables the damage detector to perform efficient learning.

Second Embodiment

Next, a second embodiment will be described. In the second embodiment, an inspection image is extracted on the basis of information obtained from the inspection image (image information of a structure and information related to the image quality of the inspection image) in addition to the correction quantification information. This makes it possible to collect learning data to be used for more efficient retraining.

Figure 10:
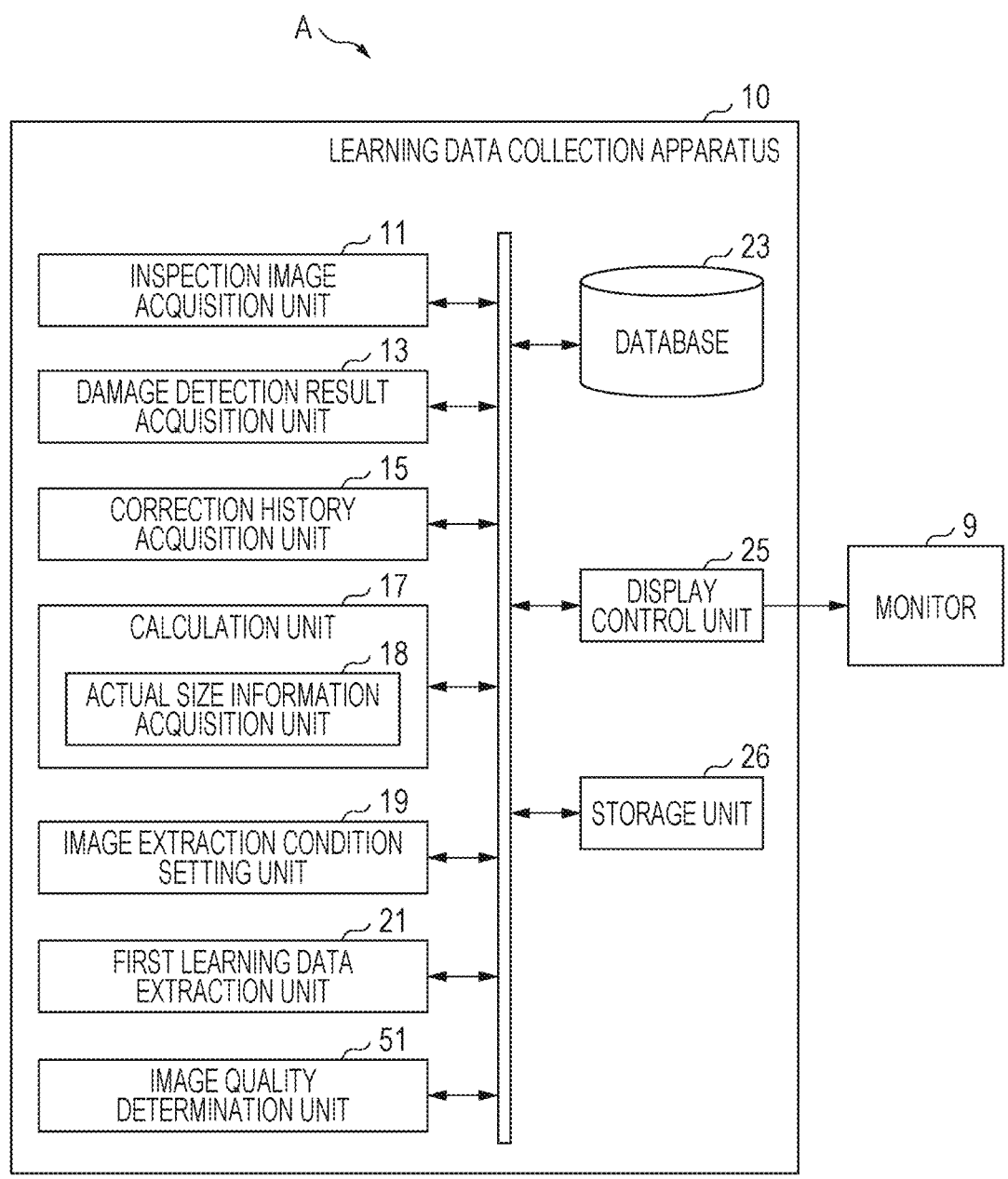
FIG. 10 is a block diagram illustrating an example configuration of functions of a learning data collection apparatus.

FIG. 10 is a block diagram illustrating an example configuration of functions of a learning data collection apparatus 10 according to this embodiment. Portions described with reference to FIG. 2 are denoted by the same reference numerals, and descriptions thereof will be omitted.

The learning data collection apparatus 10 includes the inspection image acquisition unit 11, the damage detection result acquisition unit 13, the correction history acquisition unit 15, the calculation unit 17, the actual size information acquisition unit 18, the image extraction condition setting unit 19, the first learning data extraction unit 21, an image quality determination unit 51, the database 23, the display control unit 25, and the storage unit 26.

The image extraction condition setting unit 19 according to this embodiment accepts image information of a structure, which is information obtained from an inspection image. The image information of the structure is information including at least one of size information of damage (size information of a region), position information of the damage (position information of the region), direction information of the damage (direction information of the region), type information of the damage (type information of the region), and meta information of the inspection image. The database 23 stores the image information described above in association with the inspection image. The image information is acquired when, for example, the damage detector detects damage. Specifically, the size information of the damage, the position information of the damage, the direction information of the damage, the type information of the damage, and the meta information of the inspection image are acquired in response to detection of damage by the damage detector and are uploaded in association with the inspection image.

The first learning data extraction unit 21 extracts an inspection image from the database 23 on the basis of the image information and the correction quantification information. That is, the image extraction condition setting unit 19 sets an extraction condition of image information to be extracted (to be additionally learned) and a threshold value of the correction quantification information. Specific examples of the extraction condition of the image information to be set include a condition for extracting an image having a minimum crack width of 0.2 mm or more, and a condition for extracting an image in which free lime appears in the center portion. The image extraction condition setting unit 19 may set only an extraction condition of image information. In this case, an inspection image is extracted according to the extraction condition of the image information.

Image Information of Structure

Next, image information of a structure will be described.

One example of the image information of the structure includes the size of damage. The size of damage is quantified by the pixel size or quantified by the actual size when the actual size information acquisition unit 18 is included, to form image information of the structure. Specific examples of the size of damage include the total length of the damage in the inspection image (the length of a crack in the case of a concrete structure as an inspection target, and the length of a break in the case of a steel member as an inspection target). Alternatively, the total length of a crack for each width (such as less than 0.1 mm, 0.1 mm or more and less than 0.2 mm, or 0.2 mm or more) may be set as the image information of the structure.

Other specific examples of the size of damage include the total area of the damage in the inspection image (such as water leakage, free lime, peeling, or exposure of reinforcing bars in the case of a concrete structure as an inspection target, or corrosion or deterioration of the corrosion protection function in the case of a steel member as an inspection target). Other examples include the maximum width, the maximum area (such as in the case of water leakage, free lime, peeling, exposure of reinforcing bars, and the like), the minimum spacing (the minimum distance to adjacent damage of the same type), density (such as the number of cracks per square meter, the length [crack or break], or the area [water leakage, free lime, peeling, or exposure of reinforcing bars]) of the damage.

One example of the image information of the structure includes the position of damage. The position of damage is grasped from an inspection image in which the entire member appears. Alternatively, the position of damage may be grasped using a panoramic composite image after captured images of sections into which the member is divided are combined to form a panoramic image. Specific examples of the position of damage include positions (such as a center portion/end portion), and directions (such as the bridge axis direction/a direction perpendicular to the bridge axis for a crack in the deck or the vertical direction/horizontal direction for a crack in the bridge pier).

One example of the image information of the structure includes the type of damage. The detection result of the damage detector (examples of which include detection of cracks, detection of water leakage, detection of free lime, detection of peeling, detection of exposure of reinforcing bars, detection of breaks, detection of corrosion, and detection of deterioration of the corrosion protection function) is used as the type of damage. Alternatively, the user may specify the type of damage.

One example of the image information of the structure includes meta information (Exif information). Examples of the meta information include the camera model, the lens type, the F value, the shutter speed, the focal distance, flash ON/OFF, the number of pixels, and the ISO sensitivity.

FIG. 11 is a diagram illustrating an example configuration of stored information (image information of a structure) obtained from each inspection image and stored in the database 23 in association with the inspection image. Information indicated by reference numeral 69 is information obtained from learned inspection images, and information indicated by reference numeral 71 is accessory information described below. Examples of the information obtained from each inspection image include a maximum crack width (mm), a minimum crack spacing (m), and the presence or absence of damage other than cracks, and the name of a photographed member. The information described above is obtained in response to, for example, the input of the inspection image to the damage detector. As described above, the database 23 stores image information of a structure in association with inspection images.

Example of Image Quality Determination

One example of the information obtained from each inspection image includes information related to the image quality of the inspection image.

The image quality determination unit 51 determines the image quality of the inspection image acquired by the inspection image acquisition unit 11. In this case, the image extraction condition setting unit 19 accepts information related to the image quality of the inspection image. The first learning data extraction unit 21 extracts an inspection image from the database 23 on the basis of the information related to the image quality and the threshold value of the correction quantification information.

The image quality determination unit 51 can perform determination using various methods. The following describes specific examples of the determination method used by the image quality determination unit 51.

Determination of Image Quality Using Machine Learning

An image quality determination method used by the image quality determination unit 51 is a determination method using an image quality determination tool trained by machine learning. Specifically, the image quality determination unit 51 is constituted by an image quality determination tool based on machine learning (image quality determination AI) and determines the image quality of an inspection image by using the image quality determination tool.

Determination Using Spatial Frequency Spectrum

The image quality determination unit 51 may determine the image quality of an inspection image by quantifying the image quality using the maximum or average spectrum value, the sum of the spectra, or the like of a high-frequency region in the spatial frequency spectrum of a region in the inspection image. Specifically, the larger the maximum value, the average value, or the sum of components within a radius of a specific number of pixels (r-pixel radius) from the four corners of a spatial frequency spectrum image (obtained by subjecting a captured image to a fast Fourier transform (FFT)), the stronger (more) the high-frequency components are, resulting in better image quality with less blur.

Determination Using Histogram

Figure 12:
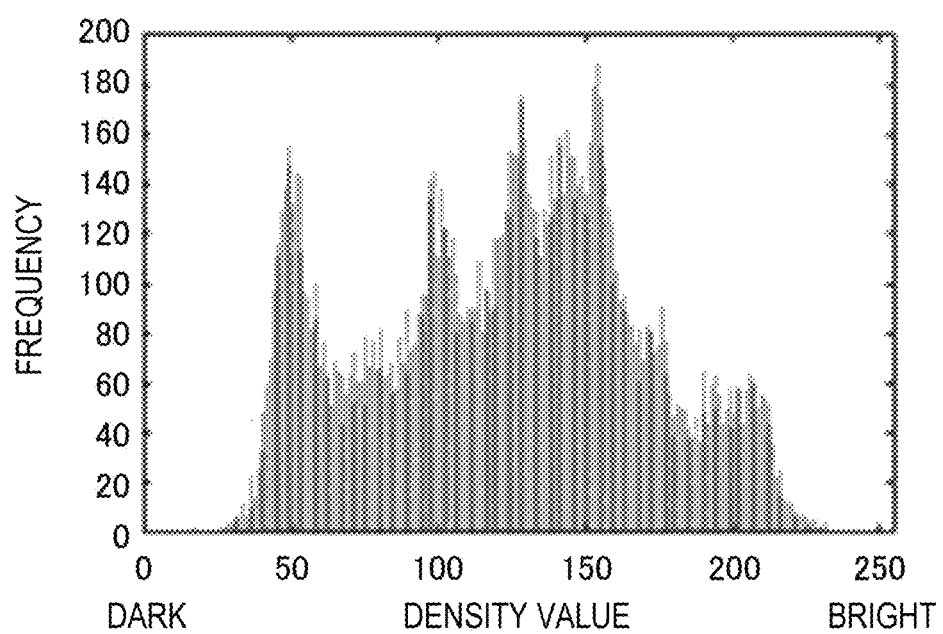
FIG. 12 is a diagram illustrating an example density histogram.

The image quality determination unit 51 performs determination using a histogram (an example of an index indicating image quality), in which the image quality determination unit 51 converts an individual image (a color image constituted by R, G, and B components) into a gray scale image. The gray scale image is expressed by, for example, gray scale (density)=R×0.30+G×0.59+B×0.11 (R, G, and B are values of red, green, and blue signals, respectively). The image quality determination unit 51 computes a histogram (density histogram, see an example in FIG. 12) of the gray scale image obtained as a result of conversion. The computation of the histogram and the following determination may be performed not on the entire individual image but on a region of the individual image. The image quality determination unit 51 determines whether the individual image is too bright or too dark in accordance with expressions (1) and (2) below using $G(i)\{i=0, 1, \ldots, 255\}$ as a histogram of density values (the closer to 0, the darker, and the closer to 255, the brighter). The threshold values (kb, hb, kd, and hd) for determination may be specified values (for example, kb=205, hb=0.5, kd=50, and hd=0.5) or may be set by the image quality determination unit 51 in accordance with input by the user via an operating unit (the keyboard 5 and the mouse 7).

[Math. 1]

$$\frac{\sum_{j=kb}^{255} G(j)}{\sum_{i=0}^{255} G(i)} \geq hb \tag{1}$$

[Math. 2]

$$\frac{\sum_{j=0}^{kd} G(j)}{\sum_{i=0}^{255} G(i)} \geq hd \tag{2}$$

When the proportion of density values equal to or greater than kb to the total density value is equal to or greater than hb in Expression (1) above, the image quality determination unit 51 determines that the individual image is "too bright". In this case, the image quality determination unit 51 determines that "the image quality is low (since the individual image is too bright)", and determines the individual image to be an image to be checked. Likewise, when the proportion of density values equal to or less than kd to the total density value is equal to or greater than hd in Expression (2), the image quality determination unit 51 determines that "the image quality is low (since the individual image is too dark)", and determines the individual image to be an image to be checked.

On the basis of the histogram, a determination can be made as to whether the gradation is lost. For example, the image quality determination unit 51 uses $G(i)\{i=0, 1, \ldots, 255\}$ as a histogram of density values and determines that "the gradation on the shadow side is lost" in the case of $G(0)>Td$. In the case of $G(255)>Tb$, the image quality determination unit 51 determines that "the gradation on the highlight side is lost". In these cases, the image quality determination unit 51 determines that "the image quality is low", and determines the individual image to be an image to be checked. The threshold values (Td and Tb) for determination may be specified values (for example, $Td=0$ and $Tb=0$) or may be set by the image quality determination unit 51 in accordance with input by the user via the operating unit (the keyboard 5 and the mouse 7).

As described above, the image quality determination unit 51 can determine the image quality of an inspection image using various methods.

In this embodiment, an inspection image is extracted on the basis of the information obtained from the inspection image (image information of the structure and information related to the image quality of the inspection image) in addition to the correction quantification information. This makes it possible to collect learning data to be used for efficient retraining.

Third Embodiment

Next, a third embodiment will be described. In the third embodiment, an inspection image is extracted on the basis of accessory information of the inspection image in addition to the correction quantification information. This makes it possible to collect learning data to be used for more efficient retraining.

Figure 13:
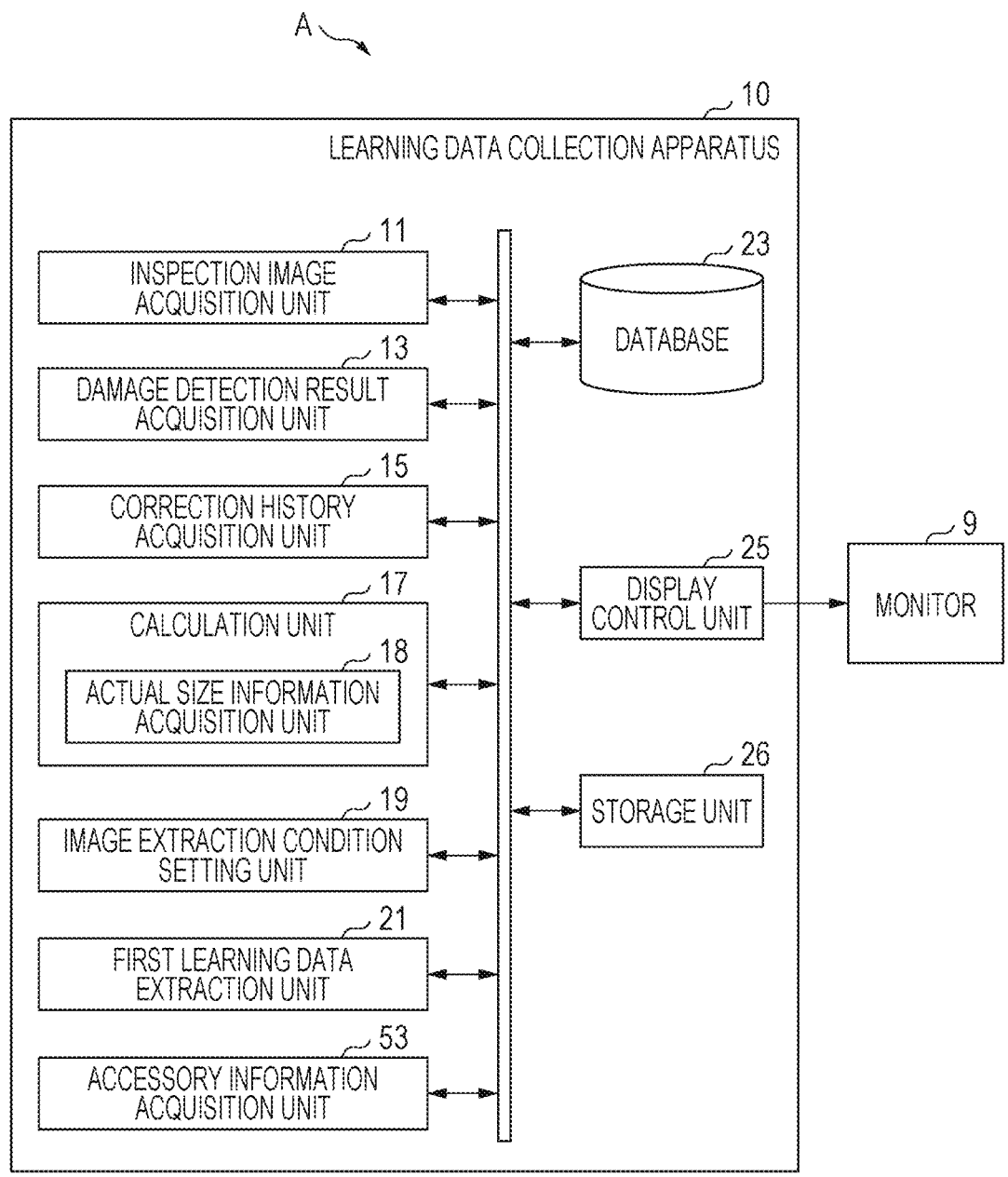
FIG. 13 is a block diagram illustrating an example configuration of functions of a learning data collection apparatus.

FIG. 13 is a block diagram illustrating an example configuration of functions of a learning data collection apparatus 10 according to this embodiment. Portions described with reference to FIG. 2 are denoted by the same reference numerals, and descriptions thereof will be omitted.

The learning data collection apparatus 10 includes the inspection image acquisition unit 11, the damage detection result acquisition unit 13, the correction history acquisition unit 15, the calculation unit 17, the actual size information acquisition unit 18, the image extraction condition setting unit 19, the first learning data extraction unit 21, an accessory information acquisition unit 53, the database 23, the display control unit 25, and the storage unit 26.

The accessory information acquisition unit 53 acquires accessory information including at least one of identification information, member information, location information, environment information, material information, inspection information, management information, and structure type information of an inspection image. In this case, the image extraction condition setting unit 19 accepts the accessory information, and the first learning data extraction unit 21 extracts an inspection image on the basis of accessory information of the inspection image and the accessory information accepted by the image extraction condition setting unit 19. That is, the image extraction condition setting unit 19 also sets the extraction condition of the accessory information to be extracted (to be additionally learned) together with the threshold value of the correction quantification information. Examples of the extraction condition of the accessory information include extraction of an image of a bridge pier within 100 m from the coast, and extraction of an image of a bridge with a traffic flow of 1000 vehicles/day or more and at the age of 30 years or more. The image extraction condition setting unit 19 may set only the extraction condition of the accessory information. In this case, an inspection image is extracted in accordance with the extraction condition of the accessory information.

The following describes specific examples of the accessory information. The identification information is, for example, the name or ID (Identification) number of the bridge. The member information is, for example, a member type (such as deck, pier, or girder) or a direction (bridge axis direction or vertical direction). The location information is, for example, a prefecture, city, town, and village, a region, a latitude and longitude, and a distance from the sea. The environment information is, for example, climate (temperature [such as an average, maximum, or minimum temperature], humidity [such as an average, maximum, or minimum humidity], rainfall, or snowfall), or traffic flow. The material information is, for example, a concrete aggregate size, a material strength (compressive strength or tensile strength). The inspection information (such as the result of the concrete coring test) is a chloride ion concentration, the progress of neutralization, or the presence or absence of alkali aggregate reaction. The management information is am age, construction conditions (such as a temperature or humidity at the time of construction), or a repair history. The structure type information is a bridge, a tunnel, a box culvert, an architectural element, or the like.

In this embodiment, learning data is extracted using the accessory information in addition to the correction quantification information. This makes it possible to extract learning data to be used for efficient retraining.

Fourth Embodiment

Next, a fourth embodiment will be described.

Figure 14:
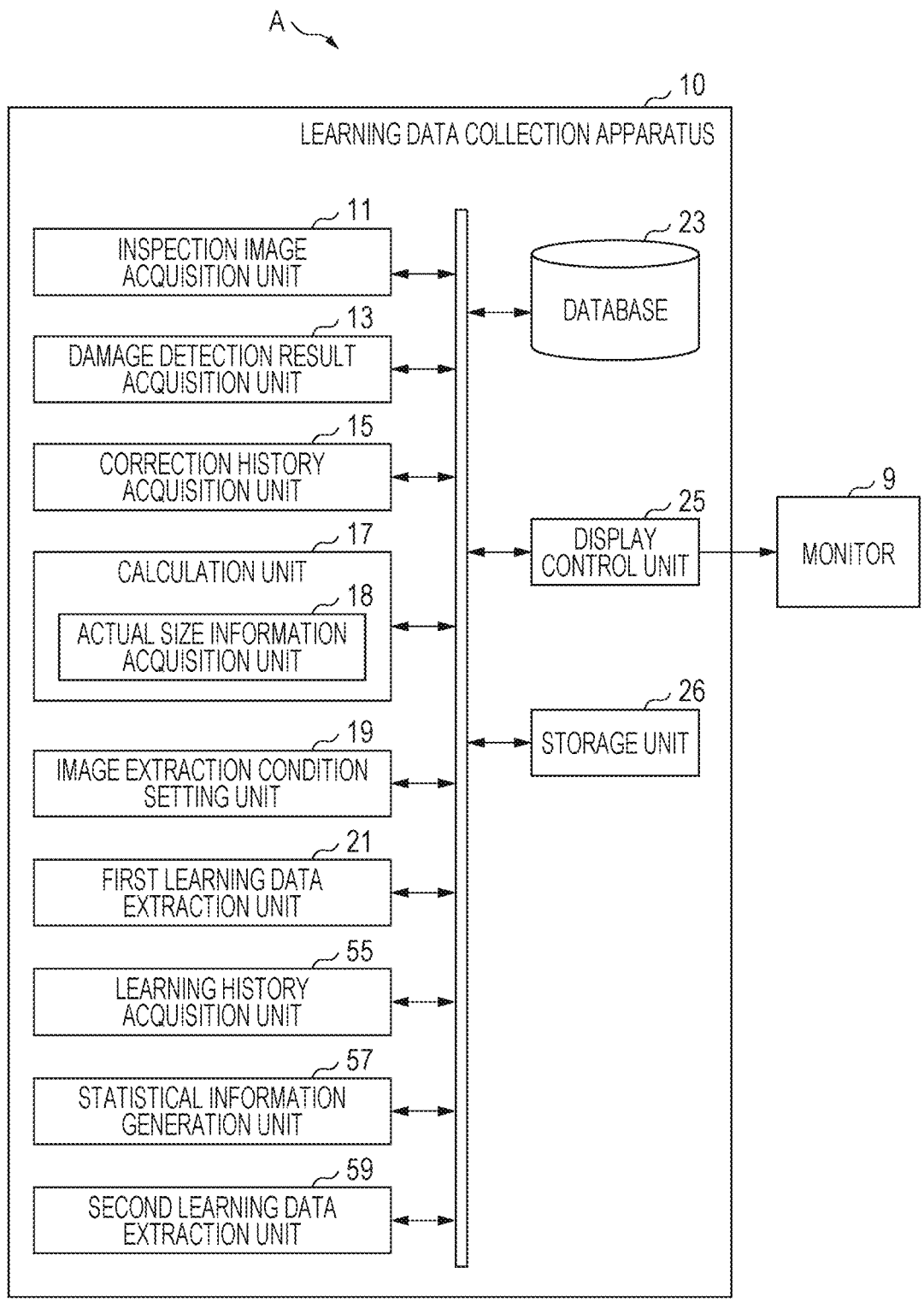
FIG. 14 is a block diagram illustrating an example configuration of functions of a learning data collection apparatus.

FIG. 14 is a block diagram illustrating an example configuration of functions of a learning data collection apparatus 10 according to this embodiment. Portions described with reference to FIG. 2 are denoted by the same reference numerals, and descriptions thereof will be omitted.

The learning data collection apparatus 10 includes the inspection image acquisition unit 11, the damage detection result acquisition unit 13, the correction history acquisition unit 15, the calculation unit 17, the actual size information acquisition unit 18, the image extraction condition setting unit 19, the first learning data extraction unit 21, a learning history acquisition unit 55, a statistical information generation unit 57, a second learning data extraction unit 59, the database 23, the display control unit 25, and the storage unit 26.

The learning history acquisition unit 55 acquires history information related to a history of uses of an inspection image for learning. Specifically, the learning history acquisition unit 55 acquires information indicating whether the inspection image acquired by the inspection image acquisition unit 11 has already been used for machine learning of the damage detector in the computer B1 or B2.

The statistical information generation unit 57 generates statistical information of an image used for learning on the basis of the acquired history information. The first learning data extraction unit 21 may extract an inspection image on the basis of the generated statistical information. That is, the image extraction condition setting unit 19 also sets the extraction condition of the statistical information to be extracted (to be additionally learned) together with the threshold value of the correction quantification information. Examples of the extraction condition of the statistical information include a condition with low frequency in image information or accessory information among images already used for learning. The image extraction condition setting unit 19 may set only the extraction condition of the statistical information. In this case, an inspection image is extracted in accordance with the extraction condition of the statistical information.

The following describes specific examples of the statistical information. In the following description, "X %" indicates a proportion of the number of images satisfying a predetermined condition to the total number of learned images.

For example, the statistical information of the maximum crack width can be expressed as X % for less than 0.05 mm, X % for 0.05 mm or more and less than 0.1 mm, X % for 0.1 mm or more and less than 0.2 mm, X % for 0.2 mm or more and less than 0.5 mm, X % for 0.5 mm or more and less than 1.0 mm, or X % for 1.0 mm or more. For example, the statistical information of the minimum crack spacing can be expressed as X % for less than 0.2 m, X % for 0.2 m or more and less than 0.5 m, X % for 0.5 m or more and less than 1 m, or X % for 1 m or more. The statistical information of the damage other than cracks can be expressed as X % for no damage, X % for water leakage, X % for free lime, X % for peeling, X % for exposure of reinforcing bars, or X % for water leakage and free lime. In addition, the statistical information can be generated using the member, the distance from the sea, the traffic flow, or the age. Alternatively, a condition of a combination of a plurality of pieces of statistical information, such as the maximum crack width and the damage other than cracks, may be generated.

The second learning data extraction unit 59 extracts an inspection image from among inspection images that are not extracted by the first learning data extraction unit 21, as learning data for retraining the damage detector. For example, the second learning data extraction unit 59 extracts, from among the inspection images that are not extracted by the first learning data extraction unit 21, inspection images randomly or regularly (for example, every predetermined number of images arranged in the order of file names). Further, the second learning data extraction unit 59 randomly extracts inspection images, except for inspection images with low image quality. The second learning data extraction unit 59 extracts the same number of inspection images as the number of inspection images extracted by the first image extraction unit 21. Learning the learning data extracted by the second learning data extraction unit 59 makes it possible to prevent the learning from being excessively influenced by inspection images in a biased condition.

Other Examples

Panoramic Composite Image

Next, a history of corrections made to a panoramic composite image will be described.

The inspection image acquired by the inspection image acquisition unit 11 includes a panoramic composite image. That is, the inspection image acquisition unit 11 acquires segment images obtained by dividing a captured image of a structure and a panoramic composite image obtained by combining the segment images. In this case, the correction history acquisition unit 15 acquires a history of corrections made to the panoramic composite image.

The first learning data extraction unit 21 extracts a region from the panoramic composite image on the basis of the history of corrections made to the panoramic composite image, and extracts at least one segment image forming the region.

Figure 15:
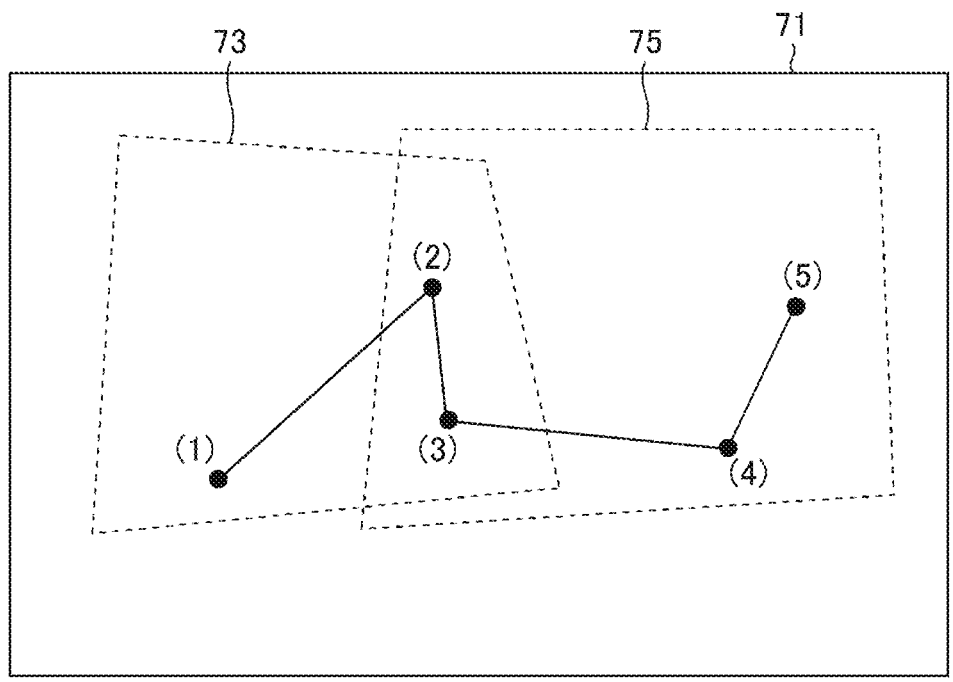
FIG. 15 is a diagram conceptually illustrating a correction history for a panoramic composite image.

FIG. 15 is a diagram conceptually illustrating a history of corrections made to the panoramic composite image acquired by the inspection image acquisition unit 11.

The user has made corrections (addition or deletion) to a panoramic composite image 71 illustrated in FIG. 15. The corrections made by the user are indicated by vectors (1) to (5). The corrections made by the user are present across a segment image 73 and a segment image 75 that form portions of the panoramic composite image 71. In this case, for example, the first learning data extraction unit 21 can automatically select an inspection image by using the following pattern. In this case, the corrections made to the panoramic composite image 71 are corrections satisfying the extraction condition set by the image extraction condition setting unit 19.

The first learning data extraction unit 21 selects all the images including the vectors (1) to (5) as pattern 1. That is, the first learning data extraction unit 21 selects the segment image 73 and the segment image 75 as learning data. As pattern 2, the first learning data extraction unit 21 selects all the segment images including the vectors (1) to (5) when each of the vectors (1) to (5) has a length greater than or equal to a predetermined threshold value. As pattern 3, the first learning data extraction unit 21 selects the segment image having the longest length and including the vectors (1) to (5). In this case, since the segment image 75 is longer than the segment image 73 and has the vectors (1) to (5), the segment image 75 is selected. As pattern 4, the first learning data extraction unit 21 compares each of the number of corrections included in the segment image 73 and the number of corrections included in the segment image 75 with a predetermined threshold value and determines whether to extract each image. As pattern 5, the first learning data extraction unit 21 determines the image quality of images including the vectors (1) to (5) and selects the image having the highest image quality.

Image Confirmation Display Unit

Next, an image confirmation display unit that displays the inspection image extracted by the first learning data extraction unit 21 or the second learning data extraction unit 59 will be described.

The learning data collection apparatus 10 can include an image confirmation display unit constituted by the monitor 9.

Figure 16:
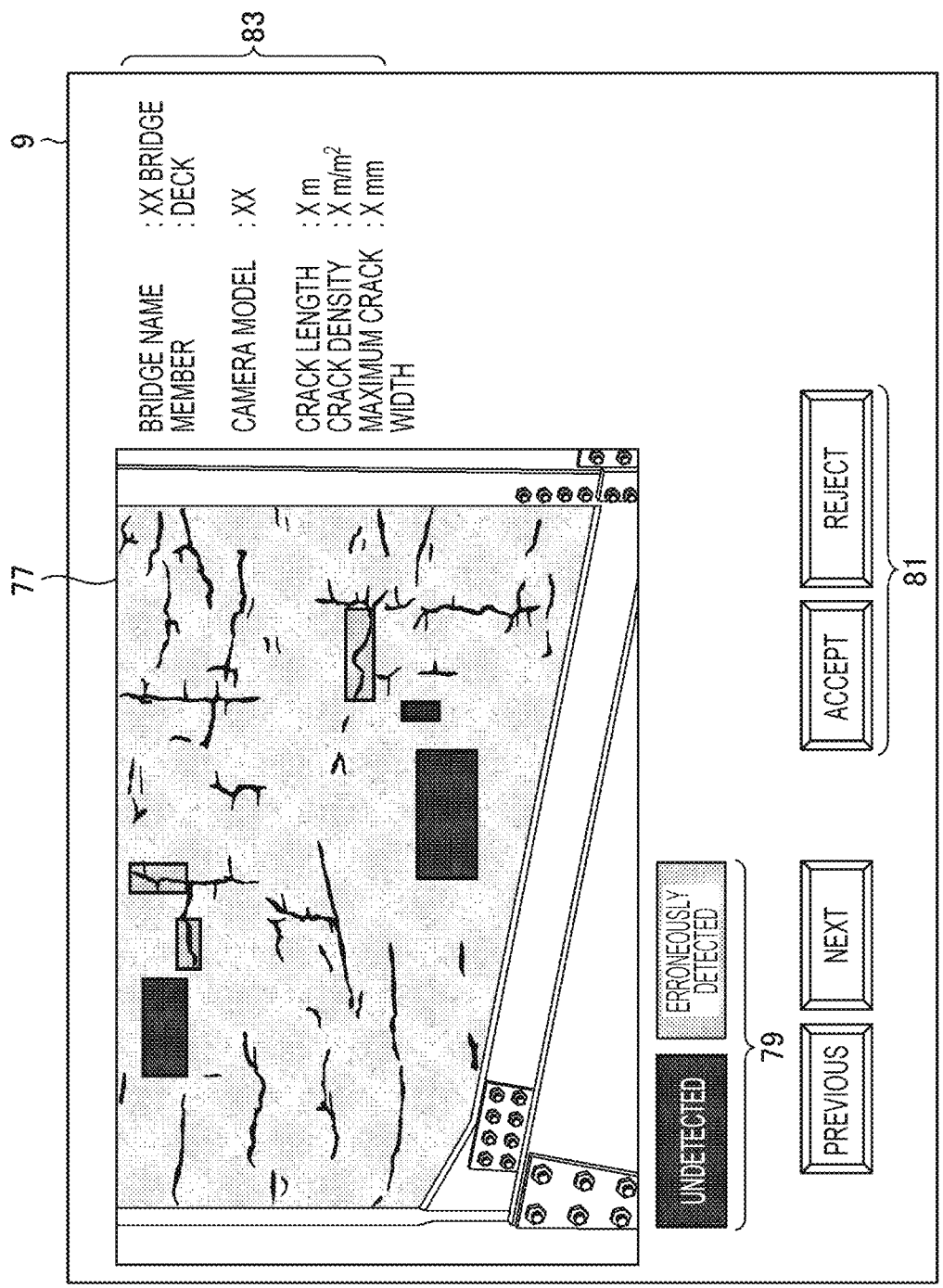
FIG. 16 is a diagram illustrating an example confirmation screen for an inspection image.

FIG. 16 is a diagram illustrating an example confirmation screen for an extracted inspection image displayed on the monitor 9. In the example illustrated in FIG. 16, an extracted inspection image 77 is illustrated. The confirmation screen is also provided with selection buttons 81 for selecting acceptance or rejection of the extracted inspection image as learning data. The confirmation screen is also provided with buttons 79 for accepting a command for clearly indicating an undetected portion, an erroneously detected portion, and the like in accordance with the correction history. The confirmation screen also has an indication 83 of information related to the inspection image (information obtained from the image and/or accessory information).

As described above, the learning data collection apparatus 10 has an image confirmation display unit, which allows the user to check the extracted inspection image. This makes it possible to collect learning data having a higher learning effect.

Other Inspection

In the foregoing description, an example has been described in which the present invention is applied to damage inspection of a structure. Examples of the inspection to which the present invention is applied are not limited to that described above. The present invention is applied to detection of a certain region (including a region of an object) by a region detector. For example, when the object to be inspected is a human body, the present invention is also applied to detection of blood vessels from a CT (Computed Tomography) image, which is an inspection image of the human body. In addition, the present invention is also applied to inspection (such as appearance inspection) of scratches on a surface or a defect of an article and a product such as a drug by using an image. The present invention is also applied to X-ray inspection of damage or defects inside a structure using an image of the damage or defects.

While the present invention has been described with reference to examples, it is to be understood that the present invention is not limited to the embodiments described above and can be modified variously without departing from the spirit of the present invention.

REFERENCE SIGNS LIST 10 learning data collection apparatus
11 inspection image acquisition unit
13 damage detection result acquisition unit
15 correction history acquisition unit
17 calculation unit
18 actual size information acquisition unit
19 image extraction condition setting unit
21 first learning data extraction unit
23 database
25 display control unit
26 storage unit
A computer
B1 computer
B2 computer
C1, C2 upload data
D retrained damage detector or detection parameter file
E1, E2 inspection image

What is claimed is:

1. A learning data collection apparatus comprising at least one processor configured to:
acquire an inspection image, the inspection image being a captured image of an object to be inspected;
acquire a region detection result on the basis of the inspection image, the region detection result indicating a region detected by a region detector that is trained;
acquire a correction history of the region detection result;
calculate correction quantification information obtained by quantifying the correction history;
store the inspection image, the region detection result, and the correction history in association with each other;
set a threshold value of the correction quantification information as an extraction condition, the extraction condition being a condition for extracting the inspection image to be used for retraining from the database; and
extract, as learning data for retraining the region detector, the inspection image satisfying the extraction condition and the region detection result and the correction history that are associated with the inspection image from the database.

2. The learning data collection apparatus according to claim 1, wherein
the at least one processor acquires actual size information of the inspection image, and calculates the correction quantification information converted into an actual size in accordance with the actual size information.

3. The learning data collection apparatus according to claim 1, wherein
the at least one processor accepts image information of the object, and extracts the inspection image from the database on the basis of the image information and the threshold value of the correction quantification information.

4. The learning data collection apparatus according to claim 3, wherein
the image information of the object is information including at least one of size information of the region, position information of the region, direction information of the region, type information of the region, or meta information of the inspection image.

5. The learning data collection apparatus according to claim 1, wherein
the at least one processor determines image quality of the inspection image, sets information related to the image quality of the inspection image, and extracts the inspection image from the database on the basis of the information related to the image quality and the threshold value of the correction quantification information.

6. The learning data collection apparatus according to claim 1, wherein
the at least one processor acquires accessory information including at least one of identification information, member information, location information, environment information, material information, inspection information, management information or structure type information of the inspection image, accepts the accessory information, and extracts the inspection image from the database on the basis of accessory information of the inspection image and the accessory information.

7. The learning data collection apparatus according to claim 1, wherein
the at least one processor acquires history information related to a history of one or more uses of the inspection image for learning, generates statistical information of an image used for learning on the basis of the acquired history information, and extracts the inspection image from the database on the basis of the generated statistical information.

8. The learning data collection apparatus according to claim 1, wherein
the at least one processor acquires segment images obtained by dividing the captured image of the object, and a panoramic composite image obtained by combining the segment images, acquires the correction history for the panoramic composite image, extracts a region in the panoramic composite image on the basis of the correction history for the panoramic composite image, and extracts at least one of segment images forming the region among the segment images.

9. The learning data collection apparatus according to claim 1, wherein the at least one processor extracts, as learning data for retraining the region detector, an inspection image from among inspection images that are not extracted.

10. The learning data collection apparatus according to claim 1, further comprising
an image confirmation display configured to display the extracted inspection image and information related to the inspection image.

11. A learning data collection method comprising:
acquiring an inspection image, the inspection image being a captured image of an object to be inspected;
acquiring a region detection result on the basis of the inspection image, the region detection result indicating a region detected by a region detector that is trained;
acquiring a correction history of the region detection result;
calculating correction quantification information obtained by quantifying the correction history;
setting a threshold value of the correction quantification information as an extraction condition, the extraction condition being a condition for extracting the inspection image to be used for retraining from a database that stores the inspection image, the region detection result, and the correction history in association with each other; and
extracting, as learning data for retraining the region detector, the inspection image satisfying the extraction condition and the region detection result and the correction history that are associated with the inspection image from the database.

12. A non-transitory computer-readable recording medium storing instructions that, when read by a computer, cause the computer to execute a learning data collection process comprising:
acquiring an inspection image, the inspection image being a captured image of an object to be inspected;
acquiring a region detection result on the basis of the inspection image, the region detection result indicating a region detected by a region detector that is trained;
acquiring a correction history of the region detection result;
calculating correction quantification information obtained by quantifying the correction history;
setting a threshold value of the correction quantification information as an extraction condition, the extraction condition being a condition for extracting the inspection image to be used for retraining from a database that stores the inspection image, the region detection result, and the correction history in association with each other; and
extracting, as learning data for retraining the region detector, the inspection image satisfying the extraction condition and the region detection result and the correction history that are associated with the inspection image from the database.

* * * * *